US005200254A

United States Patent [19]

Henry et al.

[11] Patent Number: 5,200,254

[45] Date of Patent: Apr. 6, 1993

[54] RECEPTOR SHEET MANIFOLDS FOR THERMAL MASS TRANSFER IMAGING

[75] Inventors: Robert M. Henry, Round Rock; David N. Anderson, Austin; Feng M. Lin, Austin; Manisha Sarkar, Austin; Donald J. Williams, Austin, all of Tex.

[73] Assignee: Minnesota Mining and Manufacturing Company, St. Paul, Minn.

[21] Appl. No.: 850,348

[22] Filed: Mar. 11, 1992

[51] Int. Cl.$^5$ .................... B32B 9/00

[52] U.S. Cl. .................... 428/195; 428/323; 428/331; 428/484; 428/913; 428/914

[58] Field of Search .................... 428/195, 323, 913, 914, 428/213, 216, 331, 484

[56] References Cited

U.S. PATENT DOCUMENTS

| | | | |
|---|---|---|---|
| 3,898,086 | 8/1975 | Franer et al. | 96/28 |
| 4,678,687 | 7/1987 | Malhotra | 428/195 |
| 4,686,549 | 8/1987 | Williams et al. | 503/227 |
| 4,847,237 | 8/1989 | Vanderzanden | 503/227 |
| 5,021,272 | 6/1991 | Mohri et al. | 428/40 |
| 5,093,302 | 3/1992 | Hart et al. | 428/323 |

FOREIGN PATENT DOCUMENTS

| | | |
|---|---|---|
| 052938 | 10/1981 | European Pat. Off. . |
| 3143320C2 | 11/1983 | Fed. Rep. of Germany . |

*Primary Examiner*—Patrick J. Ryan
*Assistant Examiner*—W. Krynski
*Attorney, Agent, or Firm*—Gary L. Griswold; Walter N. Kirn; Darla P. Neaveill

[57] ABSTRACT

A receptor sheet manifold for thermal mass transfer imaging comprising a polymeric image receptor sheet comprising a transparent film substrate having an image receptive layer coated on at least one surface thereof which comprises at least about 90% imaging polymer, from about 1% to about 5% perfluoroalkylsulfonamidopolyether antistatic agent, and from about 0.2% to about 5% silica particles, and attached thereto is an opaque backing sheet having a contact surface touching the attached receptor sheet, and an opposing surface having a coating comprising from about 75% to about 94% of a binder resin capable of adhering thereto, from about 1% to about 10% antistatic agent and from about 5% to about 15% of a particulate, such that the opposing surface has a Bekk smoothness of about 450 to about 550 Bekk seconds.

13 Claims, No Drawings

RECEPTOR SHEET MANIFOLDS FOR THERMAL MASS TRANSFER IMAGING

FIELD OF THE INVENTION

The invention relates to a receptor manifold for thermal mass transfer imaging, and in particular to a receptor sheet for such imaging having attached thereto a backing sheet which allows stacked feeding in thermography machines.

DESCRIPTION OF THE RELATED ART

In thermal mass transfer imaging or printing, an image is formed on a receptor sheet by selectively transferring image-forming material thereto from a donor sheet. Material to be transferred from the donor sheet is selected by a thermal printhead, which consists of small, electrically heated elements which are operated by signals from a computer in order to transfer image-forming material from the donor sheet to areas of the receptor sheet in an image-wise manner.

In mass transfer systems, the image is formed simply, by the transfer of the coloring material rather than by a color-forming chemical reaction as in chemical reaction, or "dye-transfer" imaging systems.

U.S. Pat. No. 3,898,086, a wax composition is transferred imagewise to a receptor film by means of heat which melts the wax and allows it to readhere to the receptor film upon cooling. The final step is the manual separation of the donor sheet and receptor sheet. The donor sheet, which bears a negative image, is then used as a visual transparency. The receptor film used in this process is not useful for projection due to lack of sufficient transparency.

In DE 3,143,320, pressure rather than heat is used to transfer the wax to the receptor sheet. The pressure may be applied using a pencil, typewriter, or other tool. This system is not useful in the current thermal printing systems.

A typical donor sheet for use with the modern thermal printers is a layer of pigmented wax, coated onto a paper or film substrate. U.S. Pat. No. 4,572,684 discloses thermal printing sheets for development of a multicolor image by means of overlap of colors. The layer of transfer material is disclosed to contain 1 to 20% coloring agent, 20% to 80% binder, and 3% to 25% softening agent. A solid wax having a penetration index of 10 to 30 is a preferred binder. The softening agent should be an easily meltable material such as polyvinyl acetate, polystyrene, and the like.

U.S. Pat. No. 4,847,237, Vanderzanden, discloses a kit for thermal mass transfer printing. The kit includes an image-donating sheet and an image-receptive sheet capable of producing transparent images having clear vivid colors when viewed in the projection mode. Waxes and other haze producing ingredients are eliminated from the image-donating sheet. Unlike typical systems, softening of the image-donating sheet is not required. Softening of the receptor sheet alone or of both sheets is disclosed to be efficacious.

U.S. Pat. No. 4,686,549, Williams, discloses a polymeric film receptor sheet for thermal mass transfer having a wax-compatible image receptive coating which has a softening temperature of from about 30° C. to about 90° C., and a higher critical surface tension than the donor material. The haze value of the receptor sheet must be less than 15%. Preferred coating compositions include polycaprolactones, chlorinated polyolefins, and block copolymers of styrene-ethylene/butylene-styrene. Polyethylene terephthalate is the preferred substrate.

U.S. Pat. No. 5,021,272 discloses an overhead transparency sheet printable by thermal transfer printing with a backing sheet to protect the back surface of the transparency. The backing sheets disclosed include paper, synthetic paper and plastic sheets, e.g., polyethylene, polypropylene, polyester, and the like. The surface of such sheets may be treated with antistatic agents to improve feeding ability.

Another backing sheet which performs similarly, but is limited to paper sheets, is disclosed in EP 052,938.

These composites, or manifolds, are necessary for feeding with some printers. However, some static typically develops when the manifolds are stacked in a tray for continuous feeding, resulting in the feeding of multiple sheets when a single feeding is intended. Even the use of the antistatic agents disclosed above has not total alleviated the problem.

It has now been discovered that multiple feeding can be avoided by the use of a manifold having an image receptive sheet incorporating silica particles and a backing sheet, wherein the backing sheet comprises, on the opposing side to the side contacting the image receptive sheet, a particulate, an antistatic agent, and a binder resin.

SUMMARY OF THE INVENTION

The invention provides a receptor sheet manifold for thermal mass transfer imaging comprising:

a) a polymeric image receptor sheet comprising a transparent film substrate having an image receptive layer coated on at least one surface thereof, said image receptive layer comprising at least about 90% imaging polymer, from about 1% to about 5% perfluoroalkylsulfonamidopolyether antistatic agent, and from about 0.2% to about 5% silica particles, and attached thereto b) a nontransparent backing sheet having a contact surface touching said receptor sheet, and an opposing surface, said opposing surface having a coating comprising from about 75% to about 94% of a binder resin capable of adhering thereto, from about 1% to about 10% antistatic agent or agents and from about 5% to about 15% of a particulate, such that said opposing surface has a Bekk smoothness of about 450 to about 550 Bekk seconds.

Preferred receptor sheet manifolds comprise:

a) a polymeric image receptor sheet comprising a transparent substrate having an image receptive layer coated on at least one surface, said image receptive layer comprising from about 90% to about 94% imaging polymer blend containing at least one polymer having a melt viscosity at the donor sheet wax melt temperature of at least $1\times10^5$ poise, from about 1% to about 5% of a perfluoroalkylsulfonamidopolyether antistatic agent, and from about 0.2% to about 5% fused silica particles, and attached thereto b) an opaque backing sheet comprising a synthetic paper having a contact surface touching said receptor sheet, and an opposing surface, said opposing surface having a coating comprising from about 75% to about 94% of a binder resin selected from polyalkyl carbamates, and polyalkyl modified carbamates, from about 1% to about 10% antistatic agent, and from about 5% to about 15% urea formaldehyde particles.

Receptor sheet manifolds of the invention can be stacked and fed through a thermal mass printer which has a multiple sheet feeding device. The combination of an image receptive sheet incorporating silica particles and a backing sheet comprising, on the opposing side to the side contacting the image receptive sheet, a particulate, and an antistatic agent yields decreased multiple feeding when such manifolds are used in such printers.

Highly preferred inventive manifolds comprise receptor sheets having image-receptive layers comprising imaging polymers having the following formula:

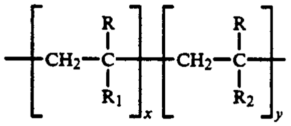

where R is selected from hydrogen or an alkyl group having 10 or fewer carbon atoms, an aryl group or alkyl substituted aryl group wherein the alkyl group has 10 or fewer carbon atoms, where $R_1$ is a pendant group selected from the group consisting of:

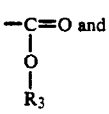 and 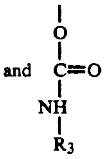

where $R_3$ is a long chain alkyl group having from about 14 to about 38 carbon atoms, where $R_2$ is selected from the group consisting of $R_1$,

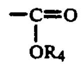 and 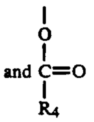

where $R_4$ is a short chain alkyl group having from 1 carbon atom to 15 carbon atoms, where x, and y are numbers related in that $x+y$ comprises 100% of the polymer; x is from about 25% to about 100% of the final polymer, and y is from 0 to about 75% of the final polymer, preferably x is from about 25% to about 95% and y is correspondingly about 5% to about 75%. The following terms having these meanings when used herein.

1. The terms "receptor sheet" and "image-receptive sheet" are interchangeably used herein, and mean a sheet of transparent polymeric film substrate, at least one major surface having an imaging layer coated thereon.

2. The terms "imaging layer" and "image-receptive layer" are used interchangeably herein, and mean a layer or coating on at least one side of the receptor sheet to improve the printability of the film substrate.

3. The term "imaging polymer" means any polymer, copolymer or mixture thereof, which improve the printability of the film substrate.

4. The term "backing sheet" means a nontransparent sheet provided with, and preferably removeably attached to, the transparent receptor sheet such that one major surface is in contact with the receptor sheet.

5. The term "overprinting" means when dots spread and merge in the half tone area.

6. The term "melt viscosity" means the real part of viscosity of a melted fluid, as measured by dynamic Oscillatory techniques at low shear rate.

7. The term "antistatic agent" means any polymer, copolymer or blend which reduces the static property of a film substrate.

All percents, parts, and ratios used herein are by weight unless specifically stated otherwise.

DETAILED DESCRIPTION OF THE INVENTION

Manifolds of the invention comprise image-receptive sheets and backing sheets attached thereto. The image-receptive sheets comprise a film substrate having image receptive layers on at least one surface thereof. Image-receptive layers useful in manifolds of the invention can comprise any polymer which is coatable and improves the printability of the transparent film substrate. Specific examples include chlorinated polyolefins, polycaprolactones, blends of chlorinated polyolefin and polymethyl methacrylate, block copolymers of styrene-ethylene/butylene-styrene, and copolymers of ethylene and vinyl acetate. Preferably, copolymers of ethylene and vinyl acetate should contain from about 10% to about 40% vinyl acetate units and blends of chlorinated polyolefins and polymethyl methacrylate should contain at least 50% of the chlorinated polyolefin. Also useful are film-forming polymers such as ethylene bisphenol-A copolymers, e,g, those commercially available from E.I. DuPont Corporation (DuPont) as Atlac™ 382-05; copolyesters such as Vitel™ PE 200, and PE 222, both commercially available from Goodyear Tire and Rubber Company; polyvinyl butyral, available as Butvar™ B72 and B76, available from Monsanto; polyvinylidene chloride acrylonitrile copolymers, available as Saran™ F310 from Dow Chemical, and polymethylmethacrylate, available as Elvacite™ 2041 from DuPont. Blends of imaging polymers are also useful.

One preferred imaging polymer has the basic formula:

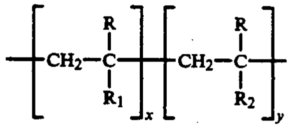

where R is selected from hydrogen or an alkyl group having 10 or fewer carbon atoms, an aryl group or alkyl substituted aryl group wherein the alkyl group has 10 or fewer carbon atoms, where $R_1$ is a pendant group selected from the group consisting of:

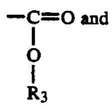 and 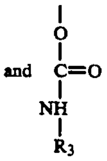

where $R_3$ is a long chain alkyl group having from about 14 to about 38 carbon atoms, preferably 14–18, where $R_2$ is selected from the group consisting of $R_1$,

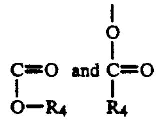

where $R_4$ is a short chain alkyl group having from 1 carbon atom to 15 carbon atoms, where x, and y are numbers related in that x+y comprises 100% of the polymer; x is from about 25% to about 100% of the final polymer, and y is from 0 to about 75% of the final polymer. Preferably x is from about 25 % to about 95% of the final polymer, and y is correspondingly from about 5% to about 75% of the final polymer. However, when $R_4$ is methyl, then Y comprises less than 50% of the final polymer for optimal print quality.

The imaging polymer may be solely comprised of the preferred imaging polymers which can be homopolymers polymerized from alkyl acrylates and methacrylates having the general structure,

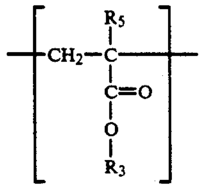

where $R_5$ represents hydrogen or $-CH_3$ and $R_3$ represents a member selected from the group consisting of alkyl group having from about 14 to about 38 carbon atoms, preferably from about 14 to about 8 carbon atoms.

Preferred imaging polymers can also be copolymerized with the following additional monomers: Vinyl acetate, and vinyl benzene, α-methyl vinyl benzene having the formula:

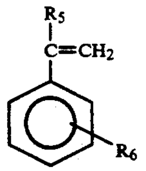

where $R_5$ represents hydrogen or $-CH_3$ and $R_6$ is selected from the group consisting of alkyl groups having up to 18 carbon atoms, halogen, hydroxide groups, alkoxy groups, acetyl groups and hydroxyalkyl groups, and can appear at the ortho, meta or para position to a vinyl group. The para position yields the preferred structure. The preferred imaging polymers may also be used in a blend with other imaging polymers.

Image receptive layers may also contain a wax to lessen tack of the preferred imaging polymer. Typical waxes include paraffin wax, microcrystalline wax, carnauba wax, and synthetic hydrocarbon waxes. The amount of wax added should not exceed 50% of the image receptive layer, preferably not more than 20%.

The preferred imaging polymers are somewhat incompatible with "Histowax" HX 0482-5, a paraffin wax, when tested as described in U.S. 4,686,549, (Williams et al.), incorporated herein by reference; because of this wax-incompatibility, no more than 25% Histowax can be included in image-receptive layers using these polymers.

Perfluoroalkylsulfonamidopolyether antistatic agents are also present in the image receptive layer. These are selected so as not to interfere with the printability of the layer. Preferred perfluoroalkylsulfonamidopolyethers antistatic agents include derivatives of the following formula:

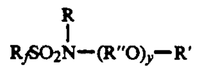

wherein R and R' are independently selected from the group consisting of hydrogen, alkyl, aryl, aralkyl, alkaryl, aminoalkyl, hydroxyalkyl, maleiamide, alkoxy, allyl and acryoyl, R and R' not being identical groups, and at least one of R and R' being a vinyl group; R'' is selected from ethyl and isopropyl groups, and $R_f$ is a perfluorinated linear or branched alkyl group containing up to about 16 carbon atoms, said alkyl group containing an extended fluorocarbon chain, said chain being both hydrophobic and oleophobic.

Preferred image-receptive layers contain from about 1% to about 5% antistatic agent and the most preferred antistatic agent according to the above formula has the following parameters: $R_f$ is $C_nF_{2n+1}$, n is an integer from 1 to 16, R is H, R'is

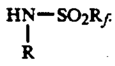

The image-receptive layer also includes silica particles, e.g, Sipernat TM particles available from DeGussa, Syloid TM particles available from Grace GmbH, and the like.

The image-receptive layer is typically coated to a thickness of from about 0.15 microns (μ) to about 1.5μ.

Substrates useful in receptor sheet manifolds of the invention include paper and any flexible, polymeric material to which an image-receptive layer can be adhered. Flexibility is required so that the receptor sheet will be able to travel through conventional thermal mass transfer printers. Whenever the receptor sheet is to be used in the preparation of transparencies for overhead projection, the substrate must be transparent to visible light. Useful substrate materials include polyesters, polysulfones, polycarbonates, polyolefins, polystyrene, and cellulose esters. Polyethylene terephthalate is a preferred substrate material. The caliper of the receptor sheet can range from about 25 μto about 125 μ, preferably from about 50 μ to about 75 μ. Adhesion of the image-receptive layer to the substrate is critical to the performance of the image-receptive sheet. Transfer from the donor sheet to the image receptive layer is effectual only if the adhesion of the image-receptive layer to the substrate is strong enough to hold the image-receptive layer thereon. The preferred image-receptive layers of the invention show good adhesion to the commonly used substrates. However, if desired, the substrate can either be surface treated for adhesion enhancement, or an adhesion enhancer can be coated onto the image-receptive layer.

Variations such as adjuvants, or additional layers may also be added where desirable, e.g., antioxidants.

Receptor sheets useful in manifolds of the invention can be prepared by mixing the imaging polymer into a suitable solvent system, coating the mixture onto the substrate, and drying in an oven. Coating techniques include curtain coating, spray coating, knife coating, bar coating, roll coating, and the like.

The receptor sheet manifold further comprises a backing sheet attached to and having one surface in contact with an image receptive sheet. The backing sheet comprises paper or a synthetic polymeric sheet material, e.g., a plastic or synthetic paper. The backing sheet may be colored or white, but must be nontransparent.

Examples of useful paper are coated paper, machine coated paper, semi-pure paper, pure paper, glassine paper, laminated paper, oil proof paper, machine glazed paper, clay art paper, casein art paper, simile paper, and the like.

Synthetic paper is preferred; where employed, it should be flexible and have a thickness which allows transport through the printer. Typical synthetic papers are manufactured by film processes. The resins are produced by blending a filler with a synthetic resin, melting and kneading the blend and then extruding. Such extrudates may have a coating layer to improve whiteness containing such adjuvants as pigments and fillers. Examples of useful films include polyethylene, polypropylene, polyvinylidene chloride, polystyrene, polyvinyl chloride, polyvinyl alcohol, polycarbonate, cellulose acetate, polyester, polyamide, polyimide, polyphenylene oxide, polysulfone, poly-4-methylpentene-1, polyurethane, and the like. The backing sheet may also comprise blends or laminates of a plurality of such films. Preferred backing sheets include filled polypropylene and polyethylene, e.g, such as Kimdura™, a filled polypropylene synthetic paper available from Kimberly-Clark Corporation.

The backing sheet contains on the opposing surface, i.e., that surface not in contact with the attached receptor sheet, a coating comprising from about 75% to about 94% of a binder resin capable of adhering to the backing sheet, from about 1% to about 10% antistatic agent and from about 5% to about 15% of a particulate, such that said opposing surface has a Bekk smoothness of about 450 to about 550 Bekk seconds. preferably about 530 Bekk seconds.

The binder resin useful on the backing sheet may be selected from any of the polymers described as imaging polymers, preferred resins include polyalkyl carbamates, polyalkyl modified carbamates, and polcaprolactone. Especially preferred are octadecyl or hexadecyl carbamates, including octadecyl modified carbamates. The binder resin comprises 75% to about 94%, preferably 80% to about 90% of the coating.

The backing sheet coating also comprises added antistatic agent. This is an antistatic agent which is added to the binder resin, and the particles and coated thereon. This is in addition to any antistatic agents which may be already present on certain coated, glazed or synthetic papers. Any conventional antistatic agent is useful herein, .e.g., quaternary ammonium salts. Preferred are stearamidopropyldimethyl β-hydroxyethyl ammonium nitrate, and N,N, bis (2-hydroxyethyl)N-(3′dodecyl 2″-hydroxypropyl) methyl ammonium sulfate, available as Cyastat™ SN and Cyastat 609 respectively, from American Cyanamid Corporation, and blends thereof.

Useful particulates for the backing sheet include urea formaldehyde particles, such as those available under the trade name Pergopak™ M2 from Ciba-Geigy Corporation. Preferably, the particles are provided in a homogenized solution for ease of handling and coating. The preferred solvent may vary, depending on such factors as the nature of the binder resin chosen and the type of material chosen for the backing sheet.

Surprisingly, it has been discovered that prior art receptor sheet manifolds containing antistatic agents alone, having lower coefficients of friction (COF) but containing differing combinations of antistatic agents and particulates in the image receptive sheet and the backing sheet, misfeed more often that receptor sheet manifolds having higher COF values, but containing the preferred combination of antistatic agents and fillers. This is not expected; a higher COF value was believed to increase the tendency of double or multiple feeds.

The backing sheet may be attached to the receptor sheet by conventional attaching means, e.g., an adhesive or tape, ultrasonic welding, and the like. Where adhesive is used, it will remain on the backing sheet when the two sheets are separated. This is easily done by using an adhesive with preferential adhesion to the backing sheet or e.g., using double-coated tape with adhesives having differing adhesions on either side. Conventional adhesives are useful in manifolds of the invention. The sheets may be separated by such methods as the use of a releasable adhesive, perforation or scoring on either sheet, pulltab or the like.

The receptor sheet manifold of the invention is useful in any thermal mass transfer imaging system, and may be produced in a variety of commercial embodiments, e.g., varying sizes.

The receptor sheet manifold of the invention is useful with all conventional thermal mass transfer apparatus requiring a nontransparent area in order to be sensed by the machine sensor, such as "Fuji Xerox Diablop" Model XJ-284 and "Okimate" models, Calcomp "Colormaster", Tektronix "Phaser" PX Model 5902, Seiko "Personal Colorpoint PS" models, and General Parametrics "Spectrastar" models.

TEST METHODS

Feed Test

This test was run at ambient temperature (22° C.) and 50% relative humidity on 8 different Tektronix™ "Phaser" PX Model 5902 thermal printers. Stacks containing 25 sheets were fed through each printer. The amount of double feed was noted and reported as an average percent for total sheets of that type tested (this number varies between 200 and 275; as some types of samples had an extra stack run). A lower percentage reflects lesser misfeed and therefore fewer multiple feeds.

Bekk Smoothness Test

Bekk smoothness was measured according to TAPPI test number "T479" on the exposed surface of the backing sheet of an imaging manifold. The surface tested is the opposing surface, i.e., the surface not in contact with the attached receptor sheet. A higher number reflects a smoother surface.

Coefficient of Friction

The coefficient of friction, or COF, measured was that between the exposed image receptor surface of one manifold and the exposed backing surface of the next manifold. This value was measured as described for the *America Society of Test Methods,* Test Number "D-1894", except that the sled weight for the clip holder was increased to 1 kilogram. A peak value at two seconds was recorded.

Melt Viscosity

Melt viscosity was measured with a Rheometrics "RMS 605" dynamic oscillatory viscometer, following the standard procedures recommended by Rheometrics, at a strain rate of 5% and frequency of 1 radian per second. The results are reported in poise.

The following examples are for illustrative purposes only, and are not intended to limit the scope of the invention which is expressed solely by the claims.

EXAMPLES

Example 1

An imaging manifold of the present invention was made in the following manner:

1) The image receptive sheet was prepared by combining 45 kg of a 5% solid solution of polyoctadecyl carbamate-co-vinyl acetate (2.3 kg dry weight) in a 70/30 toluene/methylethylketone (MEK) solution in a vessel with 5 g of Sipernat™ 22LS (available from DeGussa Chemical Corp.), and 68 g of diperfluorooctylsulfonamido polyether antistatic agent. The mixture was homogenized to form a uniform dispersion. The dispersion was then coated onto one side of a 75μ thick polyethylene terephthalate (PET) film at a dry thickness of about 0.3μ thick on a 180 line Knurl rotogravure coater. The coating was dried in a preheated oven at 85° C. for 2 minutes. The polyoctadecyl carbamate-co-vinyl acetate used as the imaging polymer had a melt viscosity of $2.1\times10^6$Poise.

2) The backing sheet was prepared by combining 45 kg of a 5% solid solution of polyoctyl carbamate-co-vinylacetate (2.3 kg dry weight) in 70/30 toluene/-MEK, 91 g of Cyastat™ SN, 91 g of Cyastat™ 609 (both available from American Cyanamide) in a vessel with 117 g of Pergopak™ M-2 particles (available from Ciba-Geigy Corp.). The mixture was homogenized to form a uniform dispersion. This dispersion was then coated onto one side of a sheet of 75μ filled white polypropylene synthetic paper having a coating of antistatic agent already present on the opposite side (commercially available as Kimdura™ from Kimberly-Clark Corp.), at a dry thickness of about 0.3 μ thick on a 180 line Knurl rotogravure coater. The coating was dried in a preheated oven at 85° C. for 2 minutes.

The image receptive sheet was attached to the backing sheet by means of an adhesive strip across the leading edge in such a way to form a manifold with the two coated surfaces on opposing rather than contacting surfaces.

The samples were tested for COF, smoothness and feedability according to the methods described and the results are reported in Table 1.

Example 1-C

This was made in a similar manner to Example 1 except that 47 g of Pergopak™ M-2 particles were used. The same COF, smoothness and feeding tests were run and the results are reported in Table 1.

Without wishing to be bound by theory, it is believed from comparing the comparative example with Example 1 of the invention that the specific combination of the antistatic agents and particulates used have a synergistic effect. The COF value differences were similar to that between other examples having little or no improvement in multiple feeding. However, there was no multiple feeding with manifolds of the invention.

Example 2-C

This was made in a similar manner to Example 1 except that Cyastat™ 609 and Cyastat™ SN in equal amounts, were used in place of Jeffamine antistatic agent, and 2% Pergopak™ M-2 was used in place of Sipernat™ 22LS in the image receptor. Feeding, COF and smoothness tests were performed and results are reported in Table 1.

Example 3-C

This was made in a similar manner to Example 1-C except that 2% Pergopak™ M-2 was used in the image receptor in place of Sipernat™ 22LS. Feeding, COF and smoothness tests were performed and results are reported in Table 1.

TABLE 1

| Ex. | COF | Smoothness (Bekk sec) | % Double Feeding |
|---|---|---|---|
| 1 | .384 | 529 ± 29 | 0 |
| 1-C | .394 | 625 ± 49 | 2.5% |
| 2-C | .30 | 529 ± 49 | 2.5% |
| 3-C | .29 | 625 ± 49 | 1.5% |

As can be seen from the above data, receptor manifolds of the invention show no misfeeding, and thus perform better than receptor manifolds having other antistatic agents on the image receptive sheet, other particles on the image receptive sheet or both.

What is claimed is:

1. A receptor sheet manifold comprising:

a) a polymeric image receptor sheet comprising: a transparent film substrate having an image receptive layer coated on at least one surface thereof, said image receptive layer comprising at least about 90% imaging polymer, from about 1% to about 5% perfluoroalkylsulfonamidopolyether antistatic agent, and from about 0.2% to about 5% silica particles, and attached thereto b) a nontransparent backing sheet having a contact surface touching said attached receptor sheet, and an opposing surface, said opposing surface having a coating comprising from about 75% to about 94% of a binder resin capable of adhering thereto, from about 1% to about 10% antistatic agent and from about 5% to about 15% of a particulate, such that said opposing surface has a Bekk smoothness of about 450 to about 550 Bekk seconds.

2. A receptor sheet manifold according to claim 1 comprising:

a) a polymeric image receptor sheet comprising: a transparent film substrate having an image receptive layer coated on at least one surface thereof, said image receptive layer comprising at least about 90% of an imaging polymer blend having at least one polymer selected from those having a melt viscosity at the donor sheet wax melt temperature of at least 1 x $10^5$ poise, from about 1% to about 5% perfluoroalkylsulfonamidopolyether antistatic agent, and from about 0.2% to about 5% fused silica particles, and attached thereto b) an opaque backing sheet comprising a synthetic paper having a contact surface touching said attached receptor sheet, and an opposing surface, said opposing surface having a coating comprising from about 75% to about 94% of a polymer selected from polyalkyl carbamates and polyalkyl modified carbamates from about 1% to about 10% antistatic agent, and from about 5% to about 15% urea formaldehyde particles.

3. A receptor sheet manifold according to wherein the perfluoroalkylsulfonamidopolyether antistatic polymer has the formula:

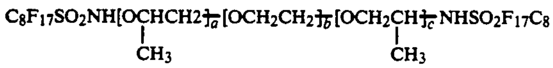

a+c is about 2.5, and b is from about 8.5 to about 131.5.

4. A receptor sheet manifold according to claim 2 wherein said backing sheet comprises a filled polypropylene sheet.

5. A receptor sheet manifold according to claim 2 wherein said imaging polymer comprises at least one polymer having the basic formula:

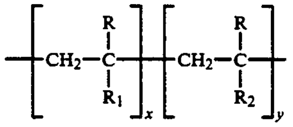

where R is selected from the group consisting of hydrogen, an alkyl group having 10 or fewer carbon atoms, an aryl group, and an alkyl substituted aryl group wherein the alkyl group has 10 or fewer carbon atoms, where $R_1$ is a pendant group selected from the group consisting of

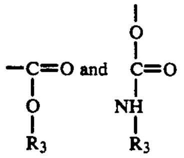

where $R_3$ is a long chain alkyl group having from about 14 to about 38 carbon atoms, where $R_2$ is selected from the group consisting of $R_1$,

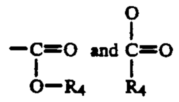

where $R_4$ is a short chain alkyl group having from 1 carbon atom to 15 carbon atoms, where x, and y are numbers related in that x+y comprises 100% of the polymer; x is from about 25% to about 100% of the final polymer, and y is from 0% to about 75% of the final polymer.

6. A receptor sheet manifold according to claim 5 wherein said imaging polymer contains at least one polymer selected from the group consisting of octdecyl modified carbamates, and partially hydrolyzed octadecyl modified carbamates.

7. A receptor sheet manifold according to claim 5 wherein said imaging polymer is a blend further comprising at least one additional imaging polymer selected from the group consisting of copolyesters, polyvinyl butyral, polyvinylidene chloride, acrylonitrile, copolymer and polymethylmethacrylate.

8. A receptor sheet manifold according to claim 1 wherein said antistatic agent contained on said backing sheet comprises at least one quaternary ammonium salt.

9. A receptor sheet manifold according to claim 8 wherein said antistatic agent is a blend of stearamidopropyldimethyl β-hydroxyethyl ammonium nitrate, and N,N, bis (2-hydroxyethyl)N-(3'dodecyl 2"-hydroxypropyl) ammonium methosulfate.

10. A receptor sheet manifold according to claim 1 wherein said binder resin for said backing sheet comprises at least one polymer selected from the group consisting of polyalkyl carbamates, and polyalkyl modified carbamates.

11. A receptor sheet manifold according to claim 10 wherein said binder resin is polyoctadecyl carbamate-co-vinylacetate.

12. A receptor sheet manifold according to claim 1 wherein said backing sheet is attached to said imaging sheet by means of an adhesive.

13. A receptor sheet manifold according to claim 1 wherein said backing sheet is removed from said receptor sheet by means of a perforation or score provided on said receptor sheet.

* * * * *